Patented Feb. 20, 1934

1,947,470

UNITED STATES PATENT OFFICE 1,947,470

METHOD OF GREASE LUBRICATION

Frank J. Hall, Cincinnati, Ohio

No Drawing. Application May 14, 1930
Serial No. 452,528

1 Claim. (Cl. 184—7)

My present invention relates to improvements in grease lubrication and is of particular application to automotive vehicles and automobiles in particular. It is desirable that some means be had of knowing whether a given bearing, for example, has been greased, particularly when this job is entrusted to others. Frequently certain bearings are overlooked and others are insufficiently greased.

In accordance with my present invention, I provide for greasing with two or more sets of greases such that the color of one is distinct from that of the other. In carrying out my invention the operator performs the entire greasing with #1 grease colored red, for example, and then after a period of use of the automobile requiring that the grease be renewed or the bearings refilled, the operator performs the operation of greasing this time with #2 grease which may be identical with grease #1 except that it has a color distinct from #1, such for example as a green color. In performing the greasing operation, the operator preferably forces the grease into bearings until the old grease has been more or less completely forced out as indicated by the distinctive color of the grease being used showing at the ends of the bearings or other part requiring lubrication. Should the operator find in a bearing a grease of the wrong color, he will know that that bearing was overlooked in the previous greasing operation.

It is well known that disputes frequently arise between motor car owners and automotive service stations over the matter of greasing of cars. By the use of the present invention, however, such disputes, if they should arise, would be speedily settled merely by inspection of the parts which were due to be greased. Under certain circumstances where it is the practice to perform the greasing operation at stated intervals of time, it may be desirable to adopt one of the colors for the first period, a second color for the second period, the first color for the third period and thus alternating. Should, upon inspection, the grease be of the wrong color corresponding to the period during which the greasing should have been performed, this will indicate that the greasing job has been omitted for that period and in this manner afford a check upon the servicing of the car in this respect.

It will be understood that while the invention is applicable to grease cups filled by hand, it is of particular advantage in the method now in most common use of greasing by means of a mechanical expressing device to receive which suitably designed and valved receptacles are provided at the parts to be greased. It will be further understood that colors used as well as the number of colored greases used is optional. As a guide to those wishing to practice the invention, I may state that for coloring grease red, an oil red of the type known to the trade as oil red T, a simple azo dye, is satisfactory, whereas for blues and greens substituted amino anthraquinone dyes are especially suitable.

I claim:

In the method of grease lubrication, the steps which consist in first forcing grease of a distinctive artificial color between parts requiring grease lubrication and then after a period of use forcing between said parts a grease of a different artificial color until the first colored grease has been forced out and the second colored grease shows at the end of the parts remote from the end at which the grease is introduced.

FRANK J. HALL.